United States Patent
Yamaguchi

(10) Patent No.: US 6,888,523 B2
(45) Date of Patent: May 3, 2005

(54) IMAGE DISPLAY METHOD AND IMAGE DISPLAY APPARATUS

(75) Inventor: Akira Yamaguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 158 days.

(21) Appl. No.: 09/989,375

(22) Filed: Nov. 21, 2001

(65) Prior Publication Data

US 2002/0084962 A1 Jul. 4, 2002

(30) Foreign Application Priority Data

Nov. 22, 2000 (JP) ...................................... 2000-356257

(51) Int. Cl.⁷ ................................................. G09G 3/36
(52) U.S. Cl. ............................ 345/87; 345/88; 345/89
(58) Field of Search .......................... 345/87, 88, 89, 345/6, 63, 549, 592, 589, 616, 591, 690, 694, 601, 611; 349/5; 348/189, 750

(56) References Cited

U.S. PATENT DOCUMENTS

| | | | | |
|---|---|---|---|---|
| 4,908,780 A | * | 3/1990 | Priem et al. ................. 345/611 |
| 5,347,620 A | * | 9/1994 | Zimmer ....................... 345/592 |
| 5,440,339 A | * | 8/1995 | Harrison et al. ............ 348/189 |
| 5,491,496 A | * | 2/1996 | Tomiyasu .................... 345/690 |
| 5,751,272 A | * | 5/1998 | Silverbrook et al. ......... 345/694 |
| 5,856,814 A | * | 1/1999 | Yagyu .......................... 345/89 |
| 5,920,361 A | * | 7/1999 | Gibeau et al. ............... 348/750 |
| 6,104,446 A | * | 8/2000 | Blankenbecler et al. ....... 349/5 |
| 6,133,894 A | * | 10/2000 | Yagyu .......................... 345/89 |
| 6,310,667 B1 | * | 10/2001 | Nakayoshi et al. ............ 349/42 |
| 6,329,963 B1 | * | 12/2001 | Chiabrera et al. .............. 345/6 |
| 6,342,896 B1 | * | 1/2002 | Shetter et al. ............... 345/589 |
| 6,476,824 B1 | * | 11/2002 | Suzuki et al. ................ 345/690 |
| 6,556,214 B1 | * | 4/2003 | Yamada et al. .............. 345/616 |
| 6,570,584 B1 | * | 5/2003 | Cok et al. .................... 345/690 |

FOREIGN PATENT DOCUMENTS

JP  11-311971 A  11/1999
JP  11-352954 A  12/1999

OTHER PUBLICATIONS

Inside Windows 3.11 New Rider Publishing, Jim Boyce et al. edition 1994, pp. 138, 139.*
IPersonal Computer Secrets, Bob O'donnell IDG Books 1999, p. 121, 122.*
Patent Abstract of Japan 11–311971, Nov. 9, 1999.
Patent Abstract of Japan 11–352954, Dec. 24, 1999.

* cited by examiner

*Primary Examiner*—Vijay Shankar
*Assistant Examiner*—Prabodh M Dharia
(74) *Attorney, Agent, or Firm*—Sughrue Mion, PLLC

(57) ABSTRACT

The present invention relates to an image display method of displaying an image on a monochrome display having sub-pixel structure in a main pixel comprising the steps of: transferring digital image for displaying, by way of an interface for the digital data, image expressed by a number of steps of gradation of one sub-pixel being different from that of the other sub-pixel, using image data corresponded to the main pixel of the monochrome display; and reproducing the image data corresponded to a number of steps of gradation as same as a number of steps of gradation of said one sub-pixel, using the digital data for displaying the transferred image.

20 Claims, 4 Drawing Sheets

IMAGE DISPLAY METHOD AND IMAGE DISPLAY APPARATUS

BACKGROUND OF THE INVENTION

1. Field of the Invention

The present invention relates to image display technology using a display activated in a monochrome manner (hereinafter defined as "a monochrome image display"). Particularly the present invention relates to an image display method and an image display apparatus for enabling a plurality of pieces of monochrome image display to produce greater steps of gradation pixel display having a sub-pixel structure in a main-pixel using a single video card.

2. Description of the Related Art

An image for medical treatment purposes, captured (or measured) by medical diagnostic devices such as an ultrasound diagnostic device, a CT diagnostic device, an MRI diagnostic device, an X-ray diagnostic device, or Fuji Computed Radiography abbreviated by "FCR" which are trade marks, is treated if necessary by a various kinds of image processing, and after that, is printed out by means of a laser printer, a thermal printer or the like, so that the image is reproduced as a visible image on a film-shaped recording material and thus outputted as a hard copy.

The film on which the image for medical treatment purposes is reproduced is observed at the medical treatment site by means of a light box referred to as a schaukasten and thus used for various kinds of diagnoses.

Recently, an image for medical treatment purposes taken using a medical diagnostic device is reproduced on a display as a soft copy, with which the diagnosis is performed in this way.

Further, as a medical diagnostic device display, the Cathode Ray Tube (CRT) has currently been popular; however, further a liquid crystal display (LCD) has been being considered as a medical diagnostic display because they have many advantages of such as being easy to make the display compact, thin and light.

It is commonly known that an LCD can be driven in a digital manner. Recently, the DVI (Digital Visual Interface which is standardized by Digital Display Working Group) such as can transfer a digital signal to a display has widely been used, enabling the LCD panel to produce a high-quality picture image with no deterioration due to D/A signal conversion.

Further, in one of most popular digital image I/F, such as the DVI, a serial data transferring method known as Transition Minimized Differential Signaling (TMDS) is used.

In a system like this which employs DVI digital image data transfer, when a color image having 8 bits each forming R (red), G (green) or B (blue), there is a limitation to the number of pixels which can be dealt with: namely UXGA (1600×1200 pixels)—HDTV (1920×1080 pixels), and when an image is displayed on a display having a greater number of pixels, such as a QXGA (2048×1536 pixels) color LCD panel, the image data cannot be transferred fast enough.

Thus, the LCD panel is divided into two sections to display the image using the DVI to transfer the image data to the QXGA digital color LCD panel. FIG. 3 conceptually shows one example of this.

In the system shown in FIG. 3 there are an LCD 100 and a video card 30 connected to, by way of the DVI, the video card 30 being provided in a personal computer (PC) or the like which provides the image data to the LCD 100.

The QXGA color LCD panel 102 provided to the LCD 100 is divided into a right screen 102R and a left screen 102L, each having 1024×1536 pixels.

Further, the video card 30 has two output systems, a first link 32a and a second link 32b, and the first link 32a is corresponded to the right screen 102R, and the second link 32b is corresponded to the left screen 102L. Furthermore, each of the links of the video card 30 which transfers image data transfer by way of the DVI has three channels respectively corresponded to R image data, G image data or B image data, and has a clock signal output.

Based on the construction like this, the video card 30 transfers, from the first link 32a, the clock signal and the R, G and B image data, each having 8 bits corresponded to the right screen 102R of the LCD 100, and also, transfers from the second link 32b the clock signal and the R, G and B image data. Each having 8 bits corresponds to the left screen 102L.

As above-mentioned, the number of pixels of the right screen 102R and left screen 102L of the LCD panel 102 is 1024×1536 pixels, being equal to or less than that of a UXGA. Therefore, the image data transfer can be performed properly enough even by way of the DVI, and the image can be displayed on the QXGA color LCD panel 102.

According to a video card inserted into a Peripheral Component Interconnect bus (PCI bus) normally used in a PC, for example, only two DVI connectors can be mounted, due to circumstances pertaining to a physical limitation such as the substrate and connector sizes.

Therefore, at present, when the image data is transferred to the QXGA color LCD panel by the DVI, one video card (i.e., one "card") is necessary for each LCD panel (i.e., one "head") (referred to as a one-card-one-head system) When the image is to be displayed on two LCD panels, two video cards are necessary (referred to as a two-card-two-head system).

Diagnostic images of the images used for medical treatment purposes as discussed above, which are captured using the FCR or an X-ray diagnostic device, for example, are normally displayed as monochromized images.

Further, a panel section has been realized such as making the monochrome image LCD panel achromatic.

The color LCD panel has R, G and B sub-pixels by each main pixel, so that the LCD panel, which has been made to be monochromized, also has three sub-pixels. Further, when the image is displayed on such a monochrome image LCD panel, all the sub-pixels of a single pixel is normally driven (image data of each of all the sub-pixels of the single pixel is modulated) by the same image data.

In this monochrome image LCD panel, there is a notion of using this and the DVI image data transfer is used to display the image on two QXGA panels using one video card, resulting in having a one-card-two-head system realized. A conceptual diagram of one example of this is shown in FIG. 4.

As above-mentioned, the video card 30 for using the DVI has a two-system output having the first link 32a and the second link 32b. In the system in the shown example, the first link 32a is connected to a first monochrome image LCD 110, and the second link 32b is connected to a second monochrome image LCD 112. Further, like the previous example, the connections are made by way of the DVI.

In FIG. 4 the second monochrome LCD 112 is substantially as same as the first monochrome LCD 110. Thus the monochrome image LCD 110 is shown in detail as representation of the two.

As above-mentioned, the monochrome image LCD panel 114 of the monochrome image LCD 110 (112) is a QXGA panel which has been made monochrome by making the color filter of the color LCD panel achromatic (or colorless), and it is divided into a right screen 114R and a left screen 114L each having 1024×1536 pixels, as in the color LCD panel as above.

Further, the monochrome image LCD 110 has an image data developing unit 116R corresponded to the right screen 114R, and an image data developing unit 116L corresponded to the left screen 114L.

As above-mentioned, the monochrome image LCD panel 114 has three sub-pixels (hereinafter, referred to as a first pixel (1pix), a second pixel (2pix) and a third pixel (3pix)) corresponded to the R, G and B sub-pixels of the color LCD panel, and each sub-pixel is driven by the same image data, so that a monochrome image is displayed.

Therefore, if one piece of image data per a single pixel is transferred per one pixel and the transferred one is developed into three sub-pixels, then an image can be displayed on the monochrome image LCD panel 114.

In the shown example, in the first link 32a of the video card 30 (which is the same as the second link 32b) the channel which corresponds to the R image data transfers 8-bit monochrome image data to the developing unit 116R of the right screen 114R, and the channel corresponded to the B image data transfers 8-bit monochrome image data to the developing unit 116L of the left screen 114L, respectively.

Note that in the present example, the channel corresponded to the G image data is not used.

The developing unit 116R, having received the image data, develops this data (duplicating the data), generates three same sets of 8-bit image data and provides these sets to the monochrome image LCD panel 114 (i.e., monochrome image LCD panel 114's driver) as image data of the first pixel, second pixel and third pixel of the pixel corresponded to the right screen 114R, and thus the image is displayed. Similarly, the developing unit 116L also develops the image data which has been provided to it, generates three similar sets of 8-bit image data and provides these sets to the monochrome image LCD panel 114 as image data of the first pixel, second pixel and third pixel of the pixel corresponded to the left screen 114L, and thus the image is displayed.

That is, according to this method, by using two channels of a single link it becomes possible to display the image on a single QXGA monochrome image LCD panel 114.

Therefore, when both of the two links provided in the video card 30 are used, the image can be displayed on two monochrome image LCD panels 114, and on the QXGA monochrome panel it is possible to achieve a one-card-two-head system using image data transferred by way of the DVI.

As known, in the use of medical treatment application, there are many cases in which several images are to be displayed, such as photographic images of different portions of the same patient, or past and present photographic images of the same patient or the like. Therefore, there are many cases of vertically displaying an image (i.e., a "portrait") while lining up two monochrome LCD's (i.e., monochrome image LCD panels) next to each other.

In an application such as this, one video card is sufficient for the one-card-two-head system, so that cost-performance is advantageously splendid.

Incidentally, in a monochrome display which has sub-pixels, as in the monochrome image LCD panel discussed above, it is possible to achieve greater steps of gradation by modulating image data of each of the sub-pixels individually as is disclosed in JP 11-311971 A and JP 11-352954 A by the assignee for the present application.

For example, in the above-mentioned monochrome image LCD panel being formed by a color LCD in which the color filter has been made to be achromatic, when each of the sub-pixels can be driven by 8 bits (i.e., 256 steps of gradation) it is possible to achieve display using gradation formed by 9.5 bits (i.e., 766 steps of gradation) on a single pixel having three sub-pixels.

In a medical application, in order to perform an accurate diagnosis it is necessary to have greater steps of gradation and higher picture quality image. Thus this method is extremely advantageous.

When this method is used to increase a number of step of gradation, if, e.g. the monochrome image LCD panel having the three sub-pixels is to be used to display an image formed by 9.5 bits then it is necessary for each of the three sub-pixels to be driven using the 8 bits separately and independently.

Therefore, in this case, when the DVI is to be used to transfer the data to display an image on the QXGA monochrome image LCD panel, then it is necessary to transfer the image data according to a method such as used in the case of the color LCD panel 102 shown in FIG. 3.

That is, when the sub-pixels are used to achieve the greater steps of gradation in this way, then it is not possible to achieve the one-card-two-head system as was used in the case shown in FIG. 4 in which the three sub-pixels are driven by the same image data. Accordingly, when images are displayed on two monochrome image LCD panels, there is no alternative but to adopt a two-card-two-head system, which increases cost.

SUMMARY OF THE INVENTION

It is an object of the present invention to resolve the above-mentioned problems of the conventional art and provide an image display method and an image display apparatus in which when an image is displayed on a monochrome image LCD panel having an interface for a digital image and a sub-pixel structure, when the I/F's transfer rate is insufficient for the number of panel pixels, transfer of the image data is still made possible by decreasing the quantity of data that is to be transferred and thus the image display becomes possible, such that, for example, in a one-card-two-head system in which image data is transferred by way of the DVI from a single video card to display an image on two 8-bit QXGA monochrome image LCD panels, the sub-pixels can be used to display greater steps of gradation image formed by 9.5 bits.

In order to attain the above object, followings will be provided by the present invention:

It is provided that an image display method of displaying an image on a monochrome display having sub-pixel structure in a main pixel comprising the steps of: transferring digital image for displaying, by way of an interface for the digital data, image expressed by a number of steps of gradation of one sub-pixel being different from that of the other sub-pixel, using image data corresponded to the main pixel of the monochrome display; and reproducing the image data corresponded to a number of steps of gradation as same as a number of steps of gradation of the one sub-pixel, using the digital data for displaying the transferred image.

Further it is preferable that the image data provided to the one sub-pixel are data provided for the displayed image, and the image data provided to the other sub-pixel are differential data with respective to the image data provided to the one sub-pixel.

Further, it is preferable that as to the image data transferred to the monochrome display: a number of steps of gradation of the image data corresponded to the one sub-pixel, being as same as a number of steps of gradation of an image displayed in the monochrome display; a number of steps of gradation of the image data corresponded to the other sub-pixels being represented by 1 bit; the monochrome display adding the image data represented by 1 bit to the image data of the one sub-pixel to create image data of the other sub-pixel, so that the image data is produced by sub-pixels corresponding to a number of steps of gradation being same between each of the pixels.

Further, it is preferable that the number of steps of gradation of the image displayed by the monochrome display being represented using 8 bit data.

Further, it is preferable that the monochrome display being a liquid crystal display.

Further, it is preferable that the monochrome display whose pixel number is equal to or larger than a pixel number of QXGA, having 2048 pixel multiplied by 1563 pixel.

Further, it is preferable that a plurality of monochrome displays being connected to one video card.

Furthermore, it is preferable that the monochrome display displaying an image in a portrait orientation.

DETAILED DESCRIPTION OF THE PREFERRED EMBODIMENTS

Hereinafter, explanation will be made of an image display method and an image display apparatus according to the present invention, based on a preferred embodiment shown in the attached drawings.

Figure 1:
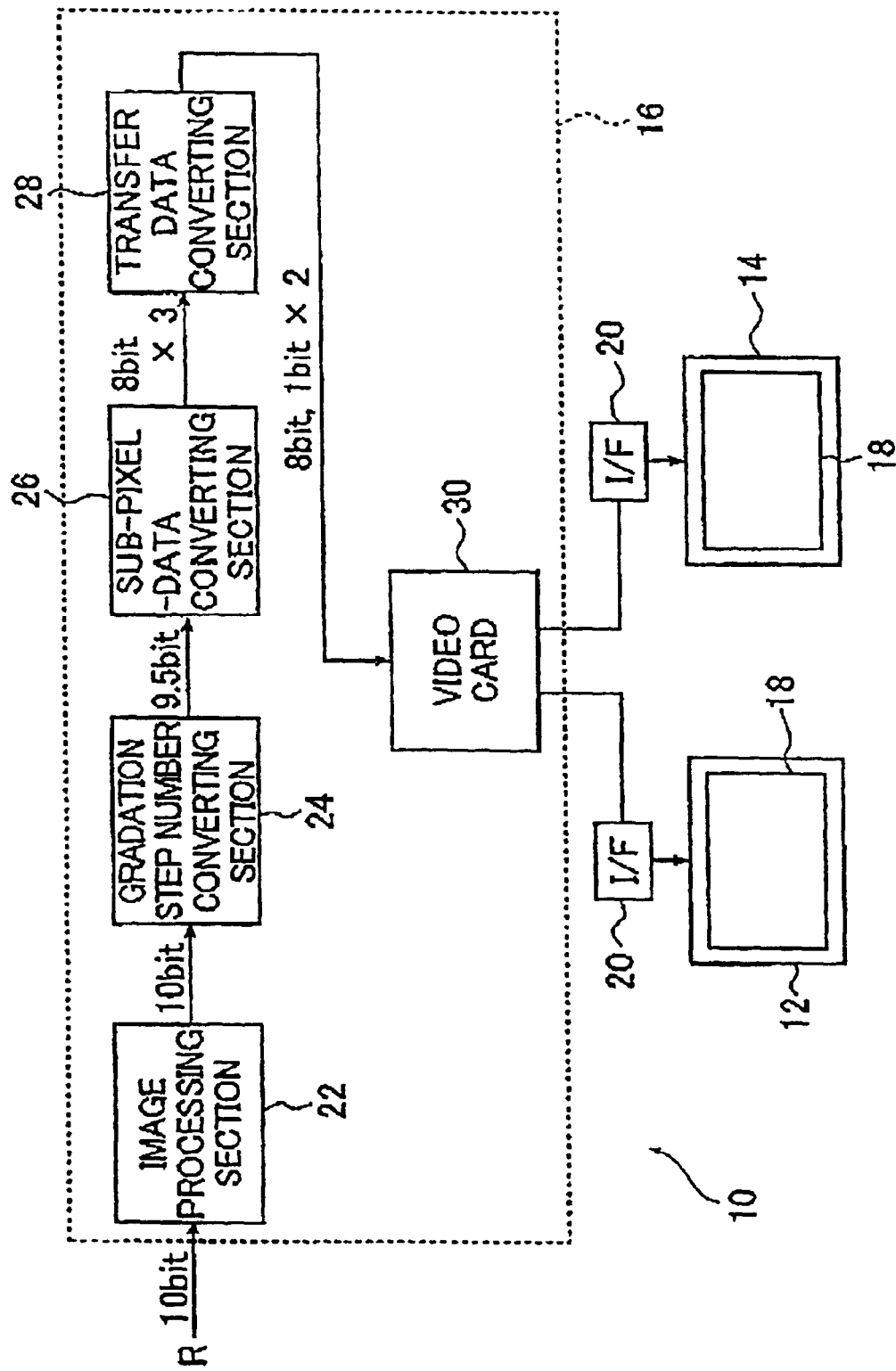
FIG. 1 is a block diagram of one example of an image display apparatus using an image display method according to the present invention.

FIG. 1 shows a conceptual diagram of one example of an image display apparatus according to the present invention, using an image display method according thereto.

An image display apparatus 10 shown in FIG. 1 (hereinafter, referred to as display apparatus 10) is basically formed by two LCDs 12 and 14, and an image providing unit 16 for providing the image data to both the LCDs.

In the display apparatus 10, both the LCD 12 and the LCD 14 are monochrome image display apparatuses for displaying an image on a monochrome LCD panel 18 (hereinafter, referred to as LCD panel 18) capable of being driven digitally. Note that although it is not shown in the diagram, it goes without saying that both LCDs each has various members provided in the display apparatus using a LCD panel, such as a back light, a driver for driving the LCD panel 18, and the like.

The image providing unit 16, the LCD 12, and LCD 14 are connected to, by way of an interface (I/F) 20 such as the DVI (Digital Visual Interface) as mentioned above.

The LCD panel 18 is, e.g., a QXGA (having 2048×1536 pixels) made to be monochrome by having had its color LCD panel filter made to be achromatic. Therefore, the LCD panel 18 has three sub-pixels as mentioned above (hereinafter, referred to as a first pixel (1pix), a second pixel (2pix) and a third pixel (3pix)), and the three sub-pixels express a single main pixel image.

The display apparatus 10 employs such a sub-pixel structure in the LCD panel 18, and each sub-pixel image data is independently modulated using 8 bits, thereby producing the result that a 9.5-bit (i.e., 766 steps of gradation) image display is achieved as in the example described above.

Figure 3:
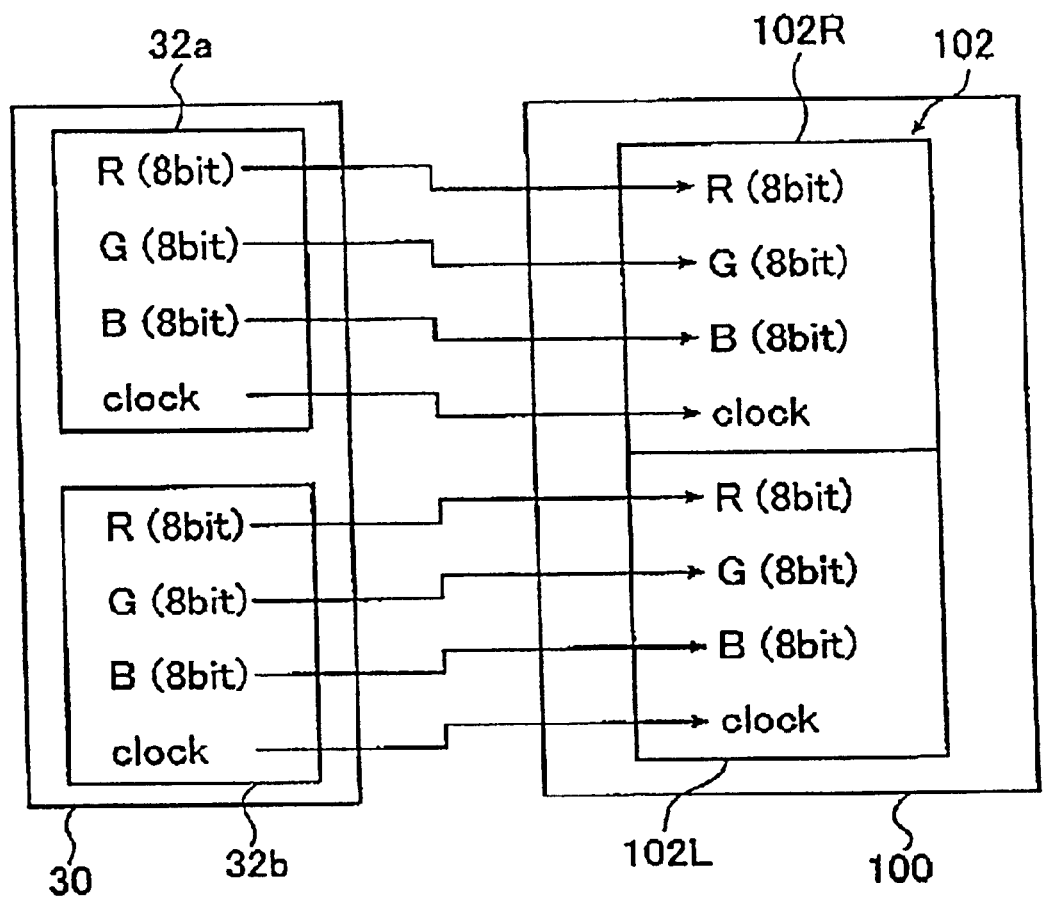
FIG. 3 is a conceptual diagram explaining one example of data transferred between a video card and an LCD in a conventional color image display apparatus.
Figure 4:
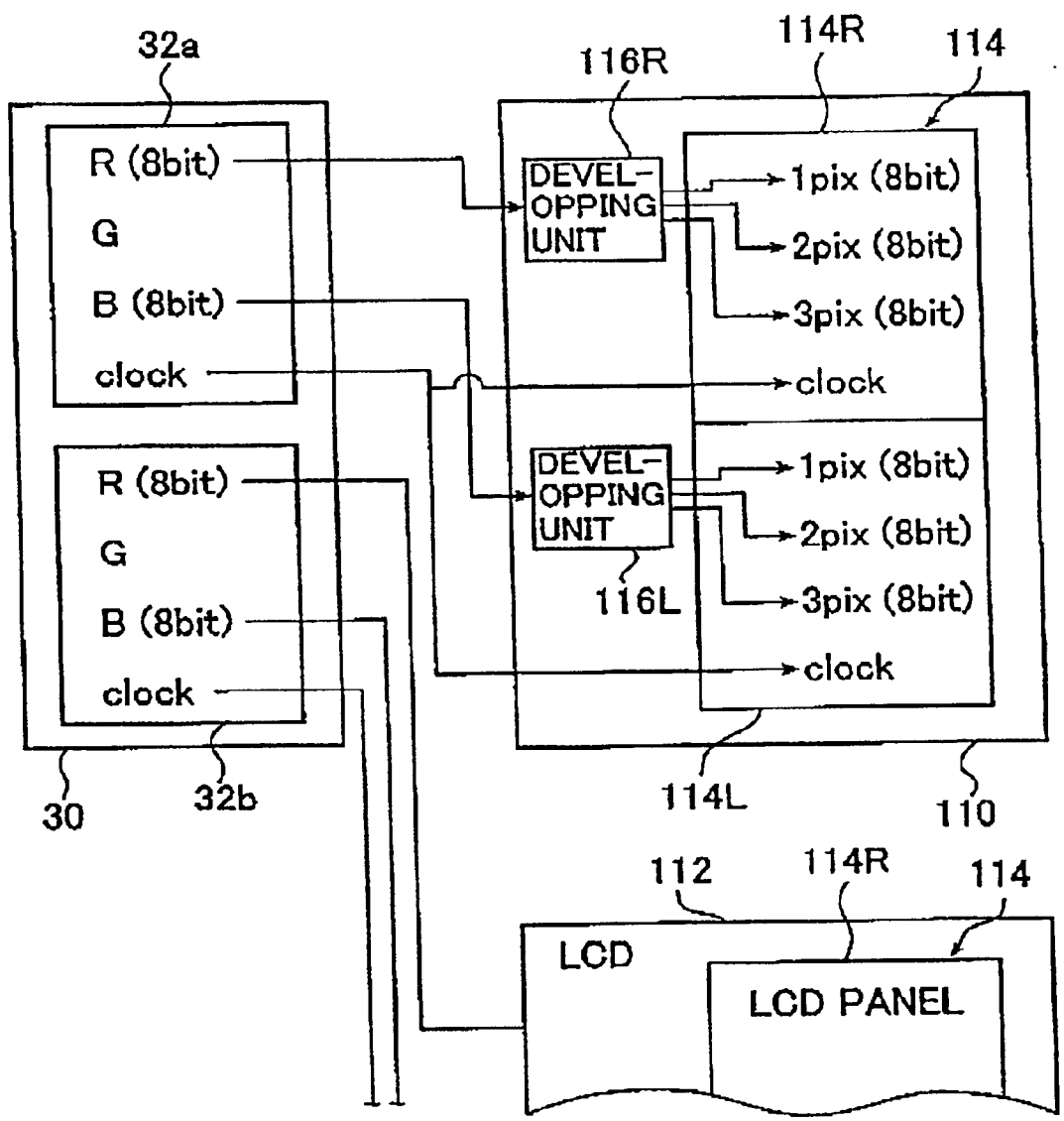
FIG. 4 is a conceptual diagram explaining one example of data transferred between a video card and an LCD in a conventional monochrome image display apparatus.

Further, in the display apparatus 10, such as the examples shown in the above-mentioned FIGS. 3 and 4, the LCD panel 18 of the QXGA is divided into two screens being a right screen 18R and a left screen 18L, each having 1024×1536 pixels.

In the embodiment of the present invention, description will be made below.

Further, in the present invention, the monochrome image display is not limited to an LCD as in the shown example. As long as the display is a monochrome image display having a sub-pixel structure for expressing one pixel by a plurality of elements, it is possible to use a CRT (Cathode Ray Tube), a DMD (Digital Micromirror Device) display, a plasma display, an organic EL (Electro Luminescence) display or other various monochrome displays.

Among them, the LCD panel, and particularly the monochrome image LCD panel according to the shown example which is formed by a color LCD which has been made monochrome, is appropriately used because it is compact, thin and light, and can be obtained easily.

Therefore, as long as the LCD panel 18 has sub-pixels, then it is also not limited to a color LCD which has been made to be monochrome, but a variety of different types can be used.

As regards an operating mode, any operating mode can also be used, such as a Twisted Nematic (TN) mode, Super Twisted Nematic (STN) mode, Electrically Controlled Birefringence (ECB) mode, In-Plane Switching (IPS) mode and Multi-domain Vertical Alignment (MVA) mode. Additionally, there are no limitation to a switching device or a matrix.

The image supplying unit 16 may be, e.g. formed by a personal computer or a part thereof, but it is basically formed by an image processing section 22, a gradation step number converting section 24, a sub-pixel data converting section 26, a transferring data converting section 28 and a video card 30.

In the display apparatus 10 according to the shown example, image data formed by 10-bit is provided from a source R which provides image data obtained by the FCR or X-ray diagnostic device or the like.

The image processing section 18 is for performing a predetermined image processing on the image data provided from the image data providing source R, such as brightness correction, sharpness correction (resolution correction), gradation conversion, and the like. Note that each of these kinds of processing may be performed using known methods.

As above-mentioned, in a display having sub-pixels in a main pixel, greater numbers of steps of gradation is achieved by individually modulating image of each of the sub-pixels.

If the display is one which has three sub-pixels capable of an image display using gradation formed by 8 bits, as shown in the example, with 8 bits×3 it becomes possible to achieve a display using gradation formed by 766 steps of gradation, which is corresponded to 9.5 bits.

As above-mentioned, the display apparatus 10 in the shown example is used to perform an image display corresponded to 9.5 bits, and by the gradation step number converting section 24, image data formed by 10 bits having been processed by means of the image processing unit 18 is converted into an image data formed by 5 bits having 766 steps of gradation (i.e., 0–765 steps) corresponded to a single pixel, and then, at the sub-pixel converting unit 26, the image data is converted into image data formed by three pieces each having 8 bits corresponded to each of the sub-pixels of a single pixel.

There are no particular limitation to the conversion method used for converting the number of steps of gradation at the gradation step number converting section 24, in which a known method can be used. For example, an example method can be given in which the image data formed by 10 bits is x and the image data formed by 9.5 bits is y, and following calculation;

$$y=(x/1023)\times 765$$

is used to create a table in which the image data x formed by 10 bits are converted into imaged data formed by 9.5 bits y, and a method of converting the number of steps of gradation is illustrated.

The sub-pixel data converting section 26 divides, the image data formed by 9.5 bits converted by the gradation step number converting section 24 into three equal parts, and one-by-one allocating the remainder into each of the pixels in order from the first pixel, the second pixel and the third pixel by starting from the first pixel, resulting in obtaining image data formed by 8 bits of each sub-pixel of the first pixel, the second pixel and the third pixel.

Concretely, the image data of each sub-pixel of a single pixel (i.e., the first, second and third pixels) can be shown as follows: the sub-pixel data converting section 26 converts the data formed by 9.5 bits of one pixel into 8 bits sets of data for the three sub-pixels such that: the value "381" of image data formed by 9.5 bits are represented by (127, 127, 127); The value "382" of the image data are represented by (128, 127, 127); The value "383" of the image data is represented by (128, 128, 127); and the value "384" of the same is represented by (128, 128, 128).

The image data formed by 8-bit of each of the sub-pixels which have been converted by the sub-pixel converting unit 26 are then converted at the transferring data converting section 28 into image data for transferring (i.e., transferring data), in order to be transferred to the LCDs 12 and 14. In the shown example, a preferable mode is shown in which the 8-bit conversion data is converted into 1-bit transferring data for the first and second pixels and an 8-bit transferring data for the third pixel (i.e., the data for the third pixel remains as it stands).

In the present invention, by having the sub-pixels, including the one pixel as above-mentioned, and the other sub-pixels constitute the image data having different steps of gradation, thereby becoming possible to significantly decrease the amount of image data being transferred, and thus perform a 9.5-bit high-gradation image display using the sub-pixels, in a one-card-two-head image display system such as described below in which the image display is performed by a single video card using the DVI data transfer, for example.

As above-mentioned, when 9.5-bit image data formed by 9.5-bit whose value is 381, is displayed by a single pixel having three sub-pixels formed by 8-bit, the value "381" of image data of the respective sub-pixels are represented by (127, 127, 127). This continues in a similar fashion thereafter, such that the value "382" of image data is represented by (128, 127, 127), the value "383" of image data is represented by (128, 128, 127) and the value "384" of image data is represented by (128, 128, 128), each being the same for the respective sub-pixels.

As apparent from above, by using this higher gradation achieved by using the sub-pixels, each of the image data at the sub-pixels is formed by the image data obtaining by adding "0" or "1" to the image data of a certain sub-pixels.

That is, by using this higher steps of gradation achieved by using the sub-pixels, the expression of the image data of one pixel can be achieved by means of one sub-pixel image data (i.e., a standard data) which corresponds to the display gradation, and differential data of 1 bit (i.e., "0" or "1"), which is taken from difference between the standard data and the image data of the other sub-pixels. Further, if the 1-bit differential data is added to the standard data, the sub-pixel image data other than the standard data can be restored easily.

Therefore, by using this method, it becomes possible to reduce the amount of data significantly, such that in a 9.5-bit image display using three sub-pixels, e.g., the data amount that would normally require at a single pixel would be 3×8=24 bits, but this can be reduced to an image data value equivalent to 8+1+1=10 bits.

The present invention uses this method, in which the transferring data converting section 28 uses the third pixel as the standard data, using the 8-bit image data provided from the sub-pixel data converting section 26 as transferring data as it stands, and the first and second pixels use the 1-bit data taken from the difference against the standard data as their transferring data.

For example, in the case of the value "381" of image data formed by 9.5-bit, the image data at each of the sub-pixels and which has been converted at the sub-pixel data converting section 26 is represented by (127, 127, 127), and thus the transferring data for the transferring data converting section 2B is the 8-bit image data 127 for the third pixel, and the differential of 0 for the first and second pixels. In other words, the transferring data is represented by (0, 0, 127).

Likewise, in the case of the value "382" of image data formed by 9.5 bits, the image data at the sub-pixels is represented by (128, 127, 127), and thus the transferring data is represented by (1, 0, 127).

In the case of the value "383" of the similar image data, the image data at the sub-pixels is represented by (128, 128, 127), and thus the transferring data is represented by (1, 1, 127).

In the case of the value "384" of the similar image data, the image data at the sub-pixels is represented by (128, 128, 128), and thus the transferring data is represented by (0, 0, 128).

The transferring data that has been converted at the transferring data converting section 28 (which is formed by 8 bits, 1 bit×2 per pixel) is sent to the video card 30, and transferred through the I/F 20 to the LCD 12 and the LCD 14.

Figure 2:
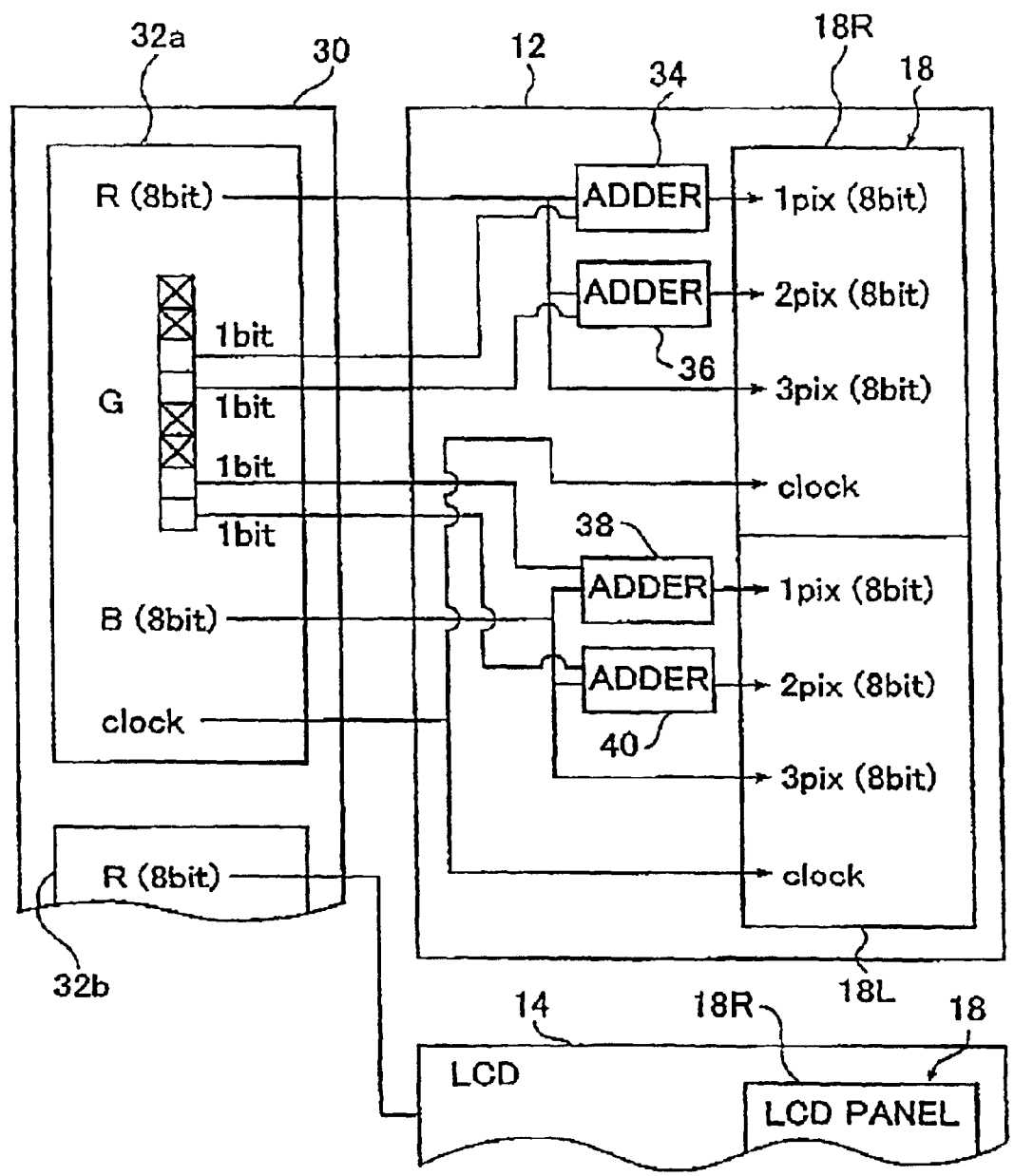
FIG. 2 is a conceptual diagram explaining data transferred between a video card and an LCD in the image display apparatus shown in FIG. 1.

FIG. 2 conceptually shows the data transfer between the video card 30 and the two LCDs.

As above-mentioned, the video card 30 is a card (i.e., display card, graphic card or graphic sub-system) corresponded to the digital I/F 20 such as the DVI, and has two output systems of a first link 32a and a second link 32b. In the shown example, the first link 32a is connected to the first LCD 12, and the second link 32b is connected to the second LCD 14.

Further, each of the links 32a,32b has three channels (hereinafter, referred to as an R channel, a G channel and a B channel) corresponded to R image data, G image data and B image data, and a clock signal output.

Further, the LCD panels 18 of the LCD 12 and the LCD 14 are QXGA panels (i.e., having 2048×1536 pixels), which are divided into a right screen 18R and a left screen 18L having 1024×1536 pixels, resulting in performing display on these screens.

Note that in the display apparatus 10, the first link 32a and the second link 32b, and also the LCD 12 and the LCD 14 have the similar constructions, and thus only the first link 32a and the LCD 12 are concretely shown in FIG. 2 and explanation of these will be made below.

In the display apparatus 10 of the shown example, that transferring data which corresponds to the display to be performed by the LCD 12 of the transferring data converted by the transferring data converting section 28 is provided to the video card 30's first link 32a, and that transferring data which corresponds to the display to be displayed by the LCD 14 thereof is provided to the video card 30's second link 32b, respectively.

As above-mentioned, in the present example, the third pixel is used as the standard pixel to generate the transferring data.

In the shown example, the transferring data for the third pixel in the right screen 18R of the LCD panel 18 of the transferring data supplied to the first link 32a (the second link 32b) is sent to the R channel.

Likewise, the transferring data for the third pixel of the left screen 18L of the LCD panel 18 thereof is sent to the B channel.

The G channel is not used in the above-mentioned example shown in FIG. 4 in which all of the sub-pixels are driven by the same image data value; however, in the present example, the G channel is used to transfer the transferring data for the first and second pixels (i.e., the differential data).

In the shown example, the transferring data for the first pixel of the right screen 18R is sent to the third bit of the G channel, and the transferring data for the second pixel is sent to the fourth bit of the G channel, respectively. On the other hand, the transferring data for the first pixel of the left screen 18L is sent to the seventh bit of the G channel, and the transferring data for the second pixel is sent to the eighth bit of the G channel, respectively.

The transferring data sent to each channel of the first link 32a is transferred to the LCD 12 by means of the I/F 20.

The LCD 12 in the shown example has adders 34 and 36 corresponded to the right screen 18R, and adders 38 and 40 to the left screen 18L. Note that the addition performed by these adders may be performed by a publicly known method.

The right screen's third pixel transferring data (i.e., 8 bits), transferred from the R channel of the first link 32a, is sent to the LCD panel 18 (i.e., to the driver thereof) and also to the adders 34 and 36, as display image data (i.e., display data) for the third pixel of the right screen 18R.

The transferring data (i.e., 1 bit) for the first pixel for the right screen 18R, sent to the third bit of the G channel, is sent to the adder 34. This transferring data is added to the third pixel's transferring data at the adder 34, and is restored as 8-bit image for the first pixel. As an example, in the case of data which originally has the value "382" of image data formed by 9.5 bits, then the image data at the respective sub-pixels is represented by (128, 127, 127) and the transferring data is represented by (1, 0, 127), as above-mentioned, so the adder 34 performs calculation of "1127+1" by adding the third pixel's to the first pixel's transferring data and restores the original image data formed by 8-bit having value 128 of the first pixel.

The restored image data formed by 8 bits is sent to the LCD panel 18 as the image data of the first pixel of the right screen 18R.

Further, the transferring data (i.e., 1 bit) for the second pixel of the right screen 18R, sent to the fourth bit of the G channel, is sent to the adder 36, and likewise this is added to the transferring data of the third pixel, and the image data formed by 8 bits of the second pixel is thus restored. For example, when the original data is image data formed by 9.5 bits whose value is 382, the value of the transferring data for the third pixel is 127 and the value of the transferring data for the second pixel is 0. Both of these are added by calculation of "127+0" by the adder 36, and the original 8-bit image data 127 of the second pixel is thus restored.

The restored 8-bit image data is sent to the LCD panel 18 as the image data for the third pixel for the right screen 18R.

The display data for the left screen 18L is also basically provided to the LCD panel 18 in a same way.

Namely, the transferring data for the third pixel of the left screen 18L sent to the B channel, is sent to the LCD panel 18 and to the adders 38 and 40 as the display data for the third pixel of the left screen 18L.

The transferring data for the first pixel of the left screen 1L sent to the seventh bit of the G channel, is sent to the adder 38, and at the adder 38 this transferring data is added to the third pixel's transferring data and the original 8-bit display data of the first pixel is restored, and additionally, the left screen 18L's second pixel transferring data, sent to the eighth bit of the G channel is sent to the adder 40, and at the adder 40 it is added to the transferring data of the third pixel and the original display data formed by 8 bits for the second pixel is restored, and each of them is sent to the LCD panel 18.

The display data is sent to the LCD panel 18 and the LCD panel 18 modulates image data of the sub-pixels of each of the pixels in response to the display data formed by 8 bits provided to the right screen 18R and the left screen 18L respectively, and thus the monochrome image formed by 9.5 bits is displayed on the QXGA LCD panel 18.

Further, in the shown example, transferring data is sent to the other LCD 14 in exactly the same fashion from the second link 32b in the video card 30, as well, and a monochrome image formed by 9.5 bits is displayed on the LCD panel 18.

Namely, in the display apparatus 10 of the present invention the differential data is used to significantly reduce the volume of transferring data, and also, there are open channels which exist in the video card links not used in the monochrome image display in which all of the normal sub-pixels are driven by the same image data, and so these open links are used, which produces the result that even in the case of DVI image data transfer, one video card 30 can be used to display an image formed by 9.5 bits (i.e., 766 steps of gradation) image on two QXGA LCD panels 18. In other words, by using an inexpensive one-card-two-head system it is possible to achieve more steps of gradation display formed by 9.5 bits by using a high resolution QXGA monochrome image LCD.

In particular, in the above-mentioned medical treatment applications there are many cases in which high-resolution, high-gradation images are necessary and two display units are lined up next to each other to display a plurality of images in a vertical fashion, so a one-card-two-head system such as this is useful.

Explanation will now be made of operations of the display apparatus 10.

In the display apparatus 10, 10-bit image data supplied from an image data supply source R is first treated at the image processing section 22 with predetermined image processing, such as gradation conversion and the like, and after that, it is converted into 9.5-bit image data at the gradation step number converting section 24.

This image data is then converted into 8-bit image data×3, which corresponds to each of the sub-pixels of one pixel, and this is then sent to the transferring data converting section 28.

At the transferring data converting section 28, the image data of the third pixel is used as a standard, the differential data is calculated as with relative to the image data of the remaining sub-pixels, and this becomes the 1-bit transferring data×2 (i.e., for pixel one and pixel two) and the 8-bit data (i.e., for pixel three), in correspondence with each of the sub-pixels.

The transferring data is sent to the video card 30.

As discussed above, at the video card 30 the transferring data which correspond to the LCD 12 is sent to each of the channels of the first link 32a, and the transferring data which corresponds to the LCD 14 is sent to each of the channels of the second link 32b, respectively.

Further, the transferring data of the third pixel of the right screen 18R of the LCD panel 18 is sent to the R channel, the transferring data for the first pixel is sent to the third bit of the G channel, and the image data for the second pixel is sent to the third bit of the G channel, respectively. On the other hand, the transferring data for the third pixel of the left screen 18L of the LCD panel 18 are sent to the B channel, the transferring data of the first pixel is sent to the seventh bit of the G channel, and the image data for the second pixel is sent to the eighth bit of the G channel, respectively.

The transferring data sent to each of the channel is sent to the LCD 12 and the LCD 14 by way of the digital I/F 20 such as the DVI.

As above-mentioned, the transferring data (i.e., 8 bits) for the third pixel is sent to the LCD panel 18 (i.e., to the driver thereof) as the display data, the transferring data (i.e., 1 bit) for the first pixel is added to the third pixel's transferring data at the adders 34 and 38, restored as the original 8-bit image data and sent to the LCD panel 18 as the image data, and additionally, the second pixel's transferring data (i.e., 1 bit) is added to the third pixel's transferring data at the adders 36 and 40, restored to the original 8-bit image data and sent to the LCD panel 18 as its image data.

In the LCD panel 18 the sub-pixels of each of the pixels are driven (i.e., image data of the sub-pixels of each of the pixels are modulated) in response to the display data which has been sent, and an image having a 9.5-bit gradation is displayed on the two LCDs 12 and 14 (i.e., the two LCD panels 18).

The foregoing is a detailed explanation of the image display method and the image display apparatus according to the present invention; however, it goes without saying that the present invention is not limited to the above embodiment, but can be improved and altered in various ways without departing from the gist of the present invention.

For example, in the shown example the image data was transferred from a single video card to two LCDs, comprising a one-card-two-head system; however, the present invention is not limited to this configuration, and it is also possible to create a one-card-two-head system in which image data is transferred to an LCD having two monochrome image LCD panels in a single display unit.

Further, the number of pixels of the monochrome image LCD panel (i.e., the monochrome image display) is not limited to the QXGA in the shown example, either. Of course, the present invention can also be utilized in the other case in which the image is to be displayed on monochrome image LCD panels such as a QSXGA (i.e., 2560×2048 pixels), a QUXGA (i.e., 3200×2400 pixels) or QUXGA-W (i.e., 3840×2400 pixels) or the like. Alternatively, in cases such as when a UXGA (i.e., 1600×1200 pixels) monochrome image LCD panel is used, which has fewer pixels than the example described above, the present invention can be used preferably even when the I/F transfer rate is insufficient.

As above-explained, according to the present invention, when the image is to be displayed on the monochrome image LCD panel having a I/F for digital data and the sub-pixel structure, it becomes possible to display greater steps of gradation image formed by 9.5 bits using the sub-pixels, and the transfer of proper image data can be achieved in a one-card-two-head system for transferring image data by way of the DVI or the like and displaying on a QXGA monochrome image LCD panel, even when the I/F transfer rate of the system is insufficient.

What is claimed is:

1. An image display method of displaying an image on a monochrome display having sub-pixel structure in a main pixel each sub-pixel of which is capable of expressing multiple steps of gradation, comprising the steps of:

forming from input monochrome image data for displaying said image on said monochrome display first image data for transfer, expressed by data of a predetermined number of steps of gradation and assigned to one sub-pixel in said main pixel of said monochrome display and second respective image data for transfer, expressed by data of a number of steps of gradation being different from said predetermined number of steps of gradation and assigned to the other sub-pixels in said main pixel;

transferring all of said first image data for said one sub-pixel and said second respective image data for the other sub-pixels from a digital video card to a digital interface of said monochrome display;

producing respective digital monochrome image data for display, expressed by data of an identical number of steps of gradation and assigned to each sub-pixel in said main pixel of said monochrome display using said first image data for said one sub-pixel and said second respective image data for the other sub-pixels transferred from said digital video card;

displaying said image on said monochrome display using the thus produced respective digital monochrome image data assigned to each sub-pixel in said main pixel.

2. The image display method according to claim 1, wherein said image data provided to said one sub-pixel are data provided for said displayed image, and said image data provided to the other sub-pixel are differential data with relative to said image data provided to said one sub-pixel.

3. The image display method according to claim 1, as to said image data transferred to said monochrome display:

a number of steps of gradation of said image data corresponded to said one sub-pixel, being as same as a number of steps of gradation of an image displayed in said monochrome display;

a number of steps of gradation of said image data corresponded to said the other sub-pixels being represented by 1 bit;

said monochrome display adding said image data represented by 1 bit to the image data of said one sub-pixel to create image data of said the other sub-pixel, so that said image data is produced by sub-pixels corresponding to a number of steps of gradation being same between each of said pixels.

4. The image display method according claim 1, said number of steps of gradation of said image displayed by said monochrome display being represented using 8 bit data.

5. The image display method according to claim 1, said monochrome display being a liquid crystal display.

6. The image display method according to claim 1, said monochrome display whose pixel number is equal to or larger than a pixel number of QXGA, having 2048 pixel multiplied by 1563 pixel.

7. The image display method according to claim 1, a plurality of monochrome displays being connected to one video card.

8. The image display method according to claim 1, said monochrome display displaying an image in a portrait orientation.

9. The image display method according to claim 1, wherein each sub-pixel is independently modulated.

10. The image display method according to claim 9, wherein at least one sub-pixel has a different number of bit representation than the others.

11. The method of claim 1, wherein in reproducing the image data using the number of steps of gradation of said one sub-pixel, image data for the other sub-pixels are obtained in derivation of the image data for said one sub-pixel.

12. An image display apparatus comprising:

a monochrome display unit displaying an image using digital monochrome image data and having a sub-pixel structure in a main pixel each sub-pixel of which is capable of expressing multiple steps of gradation;

a digital interface unit by way of which said image data are input to said monochrome display unit;

a data transferring unit including:

a transfer data forming unit for forming from supplied input digital monochrome image data first image data for transfer, expressed by data of a predetermined number of steps of gradation and assigned to one sub-pixel in said main pixel of said monochrome display and second respective image data for transfer, expressed by data of a number of steps of gradation being different from said predetermined number of steps of gradation and assigned to the other sub-pixels in said main pixel; and a digital video card for transferring all of said first image data for said one sub-pixel and said second respective image data for the other sub-pixels from a digital video card to a digital interface of said monochrome display; and a display data producing unit for producing respective digital monochrome image data for display, expressed by data of an identical number of steps of gradation and assigned to each sub-pixel in said main pixel of said monochrome display using said first image data for said one sub-pixel and said second respective image data for the other sub-pixels transferred from said digital video card, wherein said image is displayed on said monochrome display using the thus produced respective digital monochrome image data assigned to each sub-pixel in said main pixel.

13. The image display apparatus according to claim 12, said image data provided to said one sub-pixel are data provided for said displayed image, and said image data provided to the other sub-pixel are differential data with relative to said image data provided to said one sub-pixel.

14. The image display apparatus according claim 12, said number of steps of gradation of said image displayed by said monochrome display being represented using 8 bit data.

15. The image display apparatus according to claim 12, said monochrome display being a liquid crystal display.

16. The image display apparatus according to claim 12, said monochrome display whose pixel number is equal to or larger than a pixel number of QXGA, having 2048 pixel multiplied by 1563 pixel.

17. The image display apparatus according to claim 12, a plurality of monochrome displays being connected to the video card.

18. The image display apparatus according to claim 12, said monochrome display displaying an image in a portrait orientation.

19. The image display apparatus according to claim 12, wherein the monochrome display unit has multiple sub-pixels per main pixel, and further includes multiple adder circuits, wherein said one sub-pixel represents a base value for displaying an image, and said adder circuits add values of one bit to the base value to obtain gradation values for the other sub-pixels.

20. The apparatus of claim 12, wherein the image displaying unit reproduces the image data using the number of steps of gradation of said one sub-pixel, and image data for the other sub-pixels are obtained in derivation of the image data for said one sub-pixel.

* * * * *